United States Patent

Kuo

(10) Patent No.: US 9,471,096 B2
(45) Date of Patent: Oct. 18, 2016

(54) HANDLE AND ELECTRONIC DEVICE

(71) Applicant: GETAC TECHNOLOGY CORPORATION, Hsinchu County (TW)

(72) Inventor: Hsiu-Yu Kuo, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 37 days.

(21) Appl. No.: 14/618,740

(22) Filed: Feb. 10, 2015

(65) Prior Publication Data

US 2016/0088747 A1    Mar. 24, 2016

Related U.S. Application Data

(60) Provisional application No. 62/052,247, filed on Sep. 18, 2014.

(51) Int. Cl.
*H05K 7/02* (2006.01)
*H05K 7/04* (2006.01)
*G06F 1/16* (2006.01)
*F16M 11/00* (2006.01)

(52) U.S. Cl.
CPC ............... *G06F 1/16* (2013.01); *F16M 11/00* (2013.01)

(58) Field of Classification Search
USPC ............... 361/728–730, 755, 807, 809, 810, 361/679.06, 679.15, 679.27, 679.56
See application file for complete search history.

(56) References Cited

U.S. PATENT DOCUMENTS

| | | | | |
|---|---|---|---|---|
| 2012/0257342 A1* | 10/2012 | Shindo | ............... | H05K 5/023 361/679.02 |
| 2013/0113229 A1* | 5/2013 | Wu | ............... | A45F 5/10 294/138 |
| 2014/0126230 A1* | 5/2014 | Harris | ............... | A45C 13/30 362/382 |

* cited by examiner

*Primary Examiner* — Hung S Bui

(57) ABSTRACT

A handle including at least one fixing portion, a handheld portion and at least one rotating module is provided. The fixing portion is fixed at a side of a body of an electronic device. The handheld portion is pivotally disposed at the fixing portion. The rotating module includes a ratchet and a positioning ball. The ratchet has a plurality of differences, and the ratchet passes through a pivotal end of the handheld portion and fixes to the fixing portion, and the positioning ball is fixed to the pivotal end and corresponding to the ratchet. The positioning ball moves along the differences of the ratchet when the handheld portion rotates relative to the fixing portion, and the handheld portion is positioned after rotating relative to the fixing portion through the ratchet to a first position or a second position. An electronic device using the handle aforementioned is also provided.

16 Claims, 3 Drawing Sheets

HANDLE AND ELECTRONIC DEVICE

BACKGROUND OF THE INVENTION

1. Field of the Invention

The present invention relates to handles and electronic devices, and more particularly, to a multipurpose handle and an electronic device coupled to the handle.

2. Description of the Prior Art

In recent years, due to increasingly advanced technology, electronic devices, such as notebooks (NB), tablets, and smartphones, are widely used in our daily life. These electronic devices are not only becoming more diverse in terms of forms and functions, but are so convenient and practical that they are popular with consumers and serve different purposes as needed.

A conventional electronic device essentially comprises a single body or two bodies. To hold a large electronic device, such as a notebook, by hand or transport the large electronic device, a user usually has to hold the body of the electronic device by hand or put the electronic device in an additional tool, such as a bag, before transporting the electronic device. Moreover, after the user has put the electronic device on a flat surface, such as a desktop, the body of the electronic device is usually in contact with the desktop and, as a result, has an invariable operating angle. Any change can be made by the user to the operating angle of the electronic device, only if the electronic device is equipped with an additional support element or an expansion unit.

SUMMARY OF THE INVENTION

The present invention provides a handle for use with an electronic device to thereby render the electronic device multipurpose because of the handle.

The present invention provides an electronic device which is multipurpose because the electronic device is equipped with a handle.

The handle of the present invention is adapted to be disposed on a side of a body of an electronic device. The handle comprises at least one fixing portion, a handheld portion, and at least one rotating module. The fixing portion is fixed to the side of the body of the electronic device. The handheld portion is pivotally disposed at the fixing portion and separated from the side of the body by a distance. The rotating module comprises a ratchet and a positioning ball. The ratchet has a plurality of differences. The ratchet passes through a pivotal end of the handheld portion so as to be fixed to the fixing portion, such that the pivotal end of the handheld portion is pivotally disposed at the fixing portion, and the positioning ball is fixed to the pivotal end to correspond in position to the ratchet. The positioning ball moves along the differences of the ratchet when the handheld portion rotates relative to the fixing portion, such that the handheld portion produces an operating touch corresponding to different angles during rotation thereof, and the handheld portion is positioned after rotating relative to the fixing portion through the ratchet to a first position or a second position.

According to the present invention, the electronic device comprises a body and a handle. The handle is disposed on a side of the body of the electronic device. The handle comprises at least one fixing portion, a handheld portion, and at least one rotating module. The fixing portion is fixed to the side of the body of the electronic device. The handheld portion is pivotally disposed at the fixing portion and separated from the side of the body by a distance. The rotating module comprises a ratchet and a positioning ball. The ratchet has a plurality of differences. The ratchet passes through a pivotal end of the handheld portion so as to be fixed to the fixing portion, such that the pivotal end of the handheld portion is pivotally disposed at the fixing portion, and the positioning ball is fixed to the pivotal end to correspond in position to the ratchet. The positioning ball moves along the differences of the ratchet when the handheld portion rotates relative to the fixing portion, such that the handheld portion produces an operating touch corresponding to different angles during rotation thereof, and the handheld portion is positioned after rotating relative to the fixing portion through the ratchet to a first position or a second position.

In an embodiment of the present invention, the ratchet comprises a difference portion and a fastening portion connected to the difference portion. The ratchet has multiple striplike grooves arranged along a perimeter of the difference portion and in a parallel manner to form the differences. The fastening portion gets fastened to the fixing portion as soon as the ratchet passes through the pivotal end of the handheld portion.

In an embodiment of the present invention, an extension direction of the striplike grooves is parallel to a rotation axis which the handheld portion rotates about relative to the fixing portion. The positioning ball is perpendicularly disposed above the striplike grooves, so as to move into or move out of the striplike grooves successively by moving across the surface of the ratchet while the handheld portion is rotating relative to the fixing portion, thereby producing an operating touch corresponding to different angles during rotation of the handheld portion.

In an embodiment of the present invention, the positioning ball comprises an embedding portion and a ball portion disposed at an end of the embedding portion. The positioning ball is embedded in the pivotal end of the handheld portion through the embedding portion, and the ball portion is in contact with the striplike grooves of the ratchet, such that the positioning ball moves across surfaces of the striplike grooves through the ball portion while the handheld portion is rotating relative to the fixing portion.

In an embodiment of the present invention, after the handheld portion has rotated relative to the fixing portion through the ratchet to the first position, the handheld portion becomes parallel to the body, such that a user can manually hold the electronic device by the handle, wherein the handheld portion moves to below the body after the handheld portion has rotated relative to the fixing portion through the ratchet to the second position, such that the handle functions as a footrest.

In an embodiment of the present invention, the handheld portion has at least one protruding segment protruding away from the side and protruding the body from below after the handheld portion has rotated relative to the fixing portion through the ratchet to the second position, thereby producing a non-skid effect when the handle functions as the footrest.

In an embodiment of the present invention, the handheld portion has a receiving chamber, and an operating component is adapted to be disposed in receiving chamber.

In an embodiment of the present invention, the fixing portion has an admittance hole, and an operating component is adapted to be inserted into the admittance hole.

In an embodiment of the present invention, the fixing portion has a connection hole, and an operating component is adapted to connect with the connection hole through a connection line.

Given the aforesaid technical features, the handle of the present invention is characterized in that: the fixing portion is fixed to the side of the body; the handheld portion is pivotally disposed at the fixing portion through the rotating module; the ratchet of the rotating module passes through the pivotal end of the handheld portion, and the pivotal end of the handheld portion is pivotally disposed at the fixing portion; and the positioning ball of the rotating module is fixed to the pivotal end of the handheld portion to correspond in position to the ratchet. Therefore, the handheld portion rotates relative to the fixing portion through the rotating module. The positioning ball moves along the differences of the ratchet when the handheld portion rotates, such that the handheld portion produces an operating touch. The handheld portion is positioned after rotating relative to the fixing portion through the ratchet to a first position or a second position. Accordingly, the handle of the present invention is applicable to an electronic device, such that electronic device is multipurpose when equipped with the handle.

The aforesaid features and advantages of the present invention are rendered obvious and comprehensible by embodiments and drawings and described below.

DETAILED DESCRIPTION OF THE EMBODIMENTS

Figure 1:
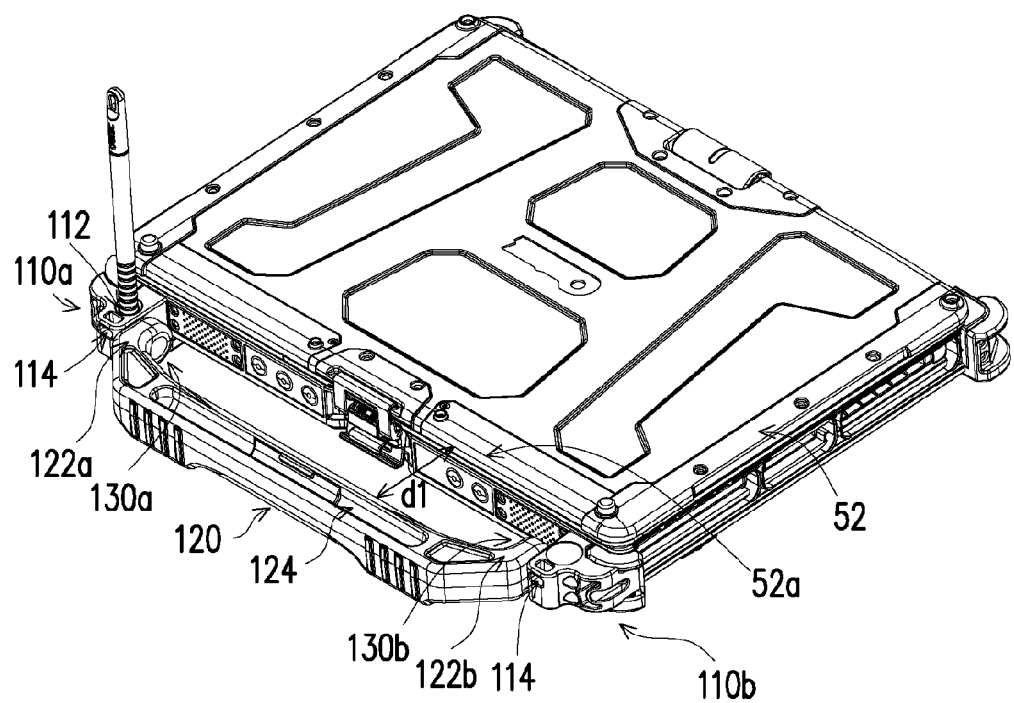
FIG. 1 is a schematic view of an electronic device according to an embodiment of the present invention.
Figure 2:
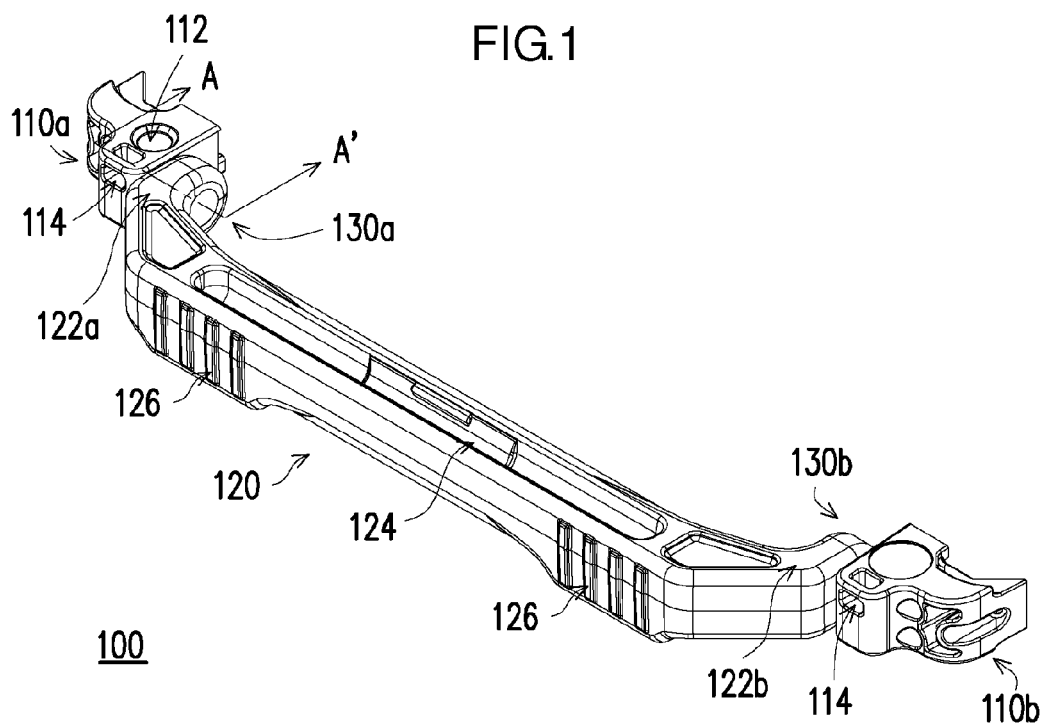
FIG. 2 is a schematic view of a handle of FIG. 1.

FIG. 1 is a schematic view of an electronic device according to an embodiment of the present invention. FIG. 2 is a schematic view of a handle of FIG. 1. Referring to FIG. 1 and FIG. 2, in this embodiment, an electronic device 50 comprises a body 52 and a handle 100. For instance, the electronic device 50 is a notebook (NB), a tablet, or any applicable electronic device. The present invention does not put a limit on the types of the electronic device 50. The handle 100 comprises two fixing portions 110a, 110b, a handheld portion 120, and two rotating modules 130a, 130b. The fixing portions 110a, 110b correspond in quantity to the rotating modules 130a, 130b, but the present invention does not put a limit on the quantity of the fixing portions 110a, 110b and the quantity of the rotating modules 130a, 130b; hence, their quantity is subject to change as needed. The handle 100 is adapted to be disposed on a side 52a of the body 52 of the electronic device 50 to diversify the purposes of the electronic device 50.

In this embodiment, the fixing portions 110a, 110b are fixed to the side 52a of the body 52. The fixing portion 110a has an admittance hole 112 and connection hole 114. An operating component, such as a stylus, for operating the electronic device 50 is adapted to be inserted into the admittance hole 112 and connected to the connection hole 114 by a connection line (not shown) to thereby prevent the operating component from falling. However, in another embodiment, the admittance hole 112 and the connection hole 114 are disposed at the fixing portion 110b, and the present invention does not put a limit on the position and provision of the admittance hole 112 and the connection hole 114. Moreover, the handheld portion 120 has two pivotal ends 122a, 122b located at two opposing ends of the handheld portion 120, respectively. The pivotal ends 122a, 122b of the handheld portion 120 are pivotally disposed at the fixing portions 110a, 110b, respectively, and separated from the side 52a of the body 52 by a distance dl (shown in FIG. 1). The handheld portion 120 has a receiving chamber 124. The operating component is adapted to be disposed in the receiving chamber 124, but the present invention does not restrict whether the receiving chamber 122 is provided. In addition, the rotating modules 130a, 130b are disposed at the handheld portion 120 and between the fixing portions 110a, 110b. Therefore, the handheld portion 120 rotates relative to the fixing portions 110a, 110b through the rotating modules 130a, 130b to thereby adjust the position of the handle 100.

Figure 3:
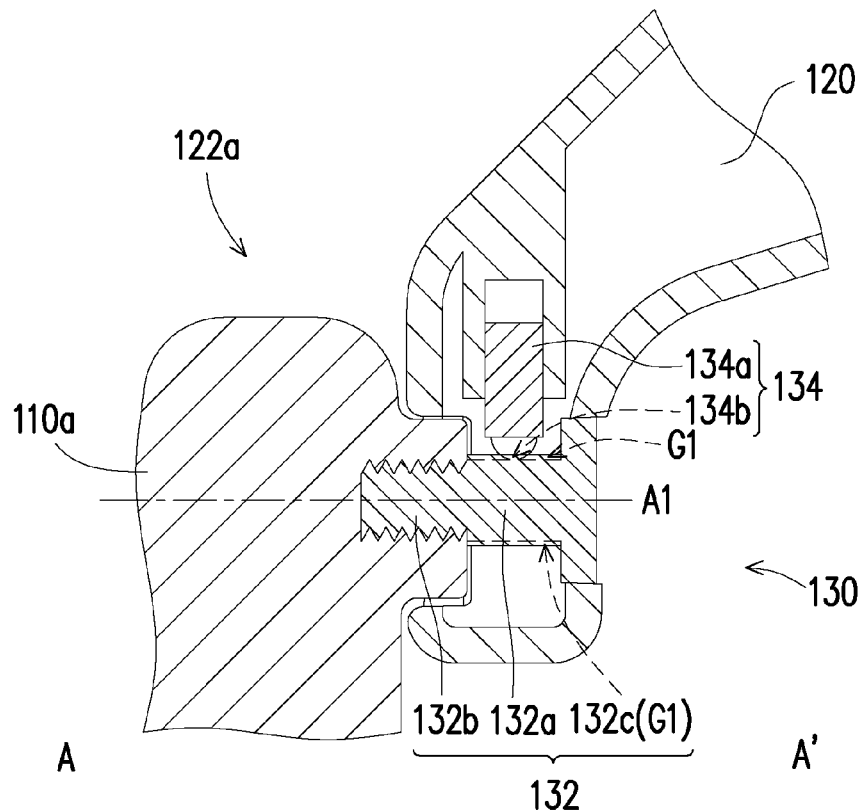
FIG. 3 is a schematic cross-sectional view of the handle taken along line A-A' of FIG. 2.
Figure 4:
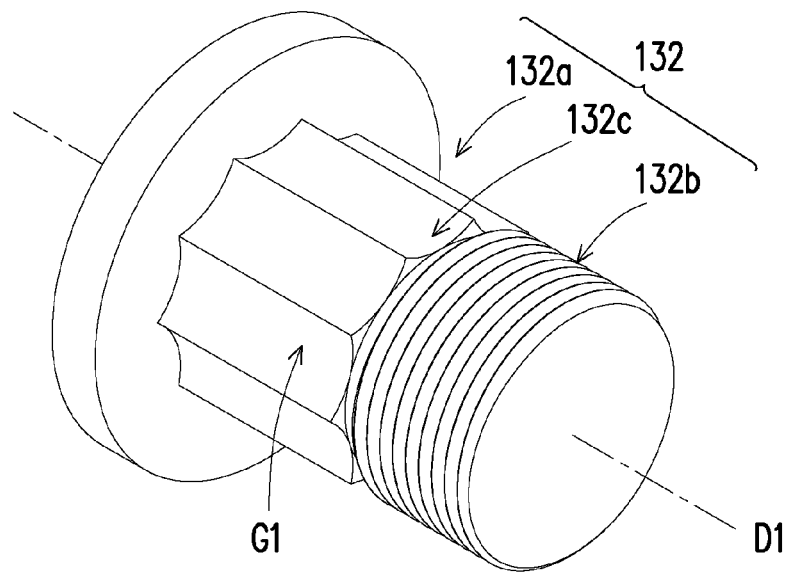
FIG. 4 is a schematic view of a ratchet of FIG. 2.

FIG. 3 is a schematic cross-sectional view of the handle taken along line A-A' of FIG. 2. FIG. 4 is a schematic view of a ratchet of FIG. 2. Referring to FIG. 1 through FIG. 4, in this embodiment, the rotating modules 130a, 130b each comprise a ratchet 132 and a positioning ball 134. The embodiment of the present invention is hereunder exemplified by the rotating module 130a. The ratchet 132 has a plurality of differences G1. The ratchet 132 passes through the pivotal end 122a of the handheld portion 120 and is fixed to the fixing portion 110a, such that the corresponding pivotal end 122a of the handheld portion 120 is pivotally disposed at the fixing portion 110a, and the positioning ball 134 is fixed to the pivotal end 122a to correspond in position to the ratchet 132. Therefore, the handheld portion 120 of the handle 100 rotates relative to the fixing portions 110a, 110b through the rotating module 130a. The positioning ball 134 of the rotating module 130a moves along differences G1 of the ratchet 132 successively when the handheld portion 120 rotates relative to the fixing portion 110a, such that the handheld portion 120 produces an operating touch corresponding to different angles during the rotation of the handheld portion 120, and the handheld portion 120 is positioned by the positioning ball 134 after rotating relative to the fixing portion 110a through the ratchet 132 to a first position P1 (shown in FIG. 5) or a second position P2 (shown in FIG. 6).

In this embodiment, the ratchet 132 comprises a difference portion 132a and a fastening portion 132b connected to the difference portion 132a. The ratchet 132 has multiple striplike grooves 132c. The striplike grooves 132c are arranged along the perimeter of the difference portion 132a and in a parallel manner. For instance, the striplike grooves 132c are aligned in an extension direction D1 (shown in FIG. 4), arranged on the surface of the difference portion 132a and in a parallel manner, and disposed along the perimeter of the difference portion 132a to form differences G1. Moreover, the fastening portion 132b gets fastened to the fixing portion 110a after the ratchet 132 has passed through the pivotal end 122a of the handheld portion 120, such that the pivotal end 122a is pivotally disposed at the fixing portion 110a. A thread is disposed on the surface of the fastening portion 132b to increase the bonding strength of the fastening portion 132b after the fastening portion 132b has been fastened to the fixing portion 110a, but the present invention does not put a limit on the way of fastening the fastening portion 132b to the fixing portion 110a.

In this embodiment, the positioning ball 134 comprises an embedding portion 134a and a ball portion 134b disposed at an end of the embedding portion 134a. The positioning ball 134 is embedded in the pivotal end 122a of the handheld portion 120 through the embedding portion 134a, and the ball portion 134b is in contact with the striplike grooves 134c of the ratchet 132. A thread is disposed on the surface of the embedding portion 134a to increase the bonding strength of the embedding portion 134a after the embedding portion 134a has been embedded in the fixing portion 110a, but the present invention does not put a limit on the way the embedding portion 134a gets embedded in the fixing portion 110a. In addition, the positioning ball 134 moves across the surfaces of the striplike grooves 132c (i.e., differences G1 of the ratchet 132) through the ball portion 134b successively when the handheld portion 120 rotates relative to the fixing portion 110a, such that the handheld portion 120 produces the operating touch. The extension direction D1 of the striplike grooves 132c is parallel to a rotation axis A1 (shown in FIG. 3) which the handheld portion 120 rotates about relative to the fixing portion 110a, and the positioning ball 134 is perpendicularly disposed above the striplike grooves 132c to abut against the surface of the difference portion 132a of the ratchet 132 so as to move into or move out of the striplike grooves 132c successively by moving across the surface of the ratchet 132 while the handheld portion 120 is rotating relative to the fixing portion 110a, thereby producing an operating touch corresponding to different angles during the rotation of the handheld portion 120.

Furthermore, the positioning ball 132 has therein an elastic element (not shown) for driving the ball portion 134b to abut against the surface of the ratchet 132 constantly. When the handheld portion 120 rotates relative to the fixing portion 110a, the positioning ball 134 embedded in the pivotal end 122a also moves relative to the ratchet 132 fixed to the fixing portion 110a. Therefore, when the ball portion 134b moves out of one of the striplike grooves 132c by moving along the surface of the ratchet 132, the ball portion 134b retracts and thereby causes the elastic element to deform. Afterward, the elastic element releases an elastic restoring force to drive the ball portion 134b to move into an adjacent one of the striplike grooves 132c. During the rotation of the handheld portion 120, the ball portion 134b moves into or moves out of the striplike grooves 132c successively in the aforesaid manner until the handheld portion 120 rotates relative to the fixing portion 110a to attain the required angle. Since the ball portion 134b moves into or moves out of the striplike grooves 132c, an operating touch corresponding to different angles is produced during the rotation of the handheld portion 120. The handheld portion 120 gets positioned as soon as the ball portion 134b moves into a corresponding one of the striplike grooves 132c while the handheld portion 120 is rotating relative to the fixing portion 110a through the ratchet 132 to attain the required angle. Likewise, the rotating module 130b also has the aforesaid design.

Figure 5:
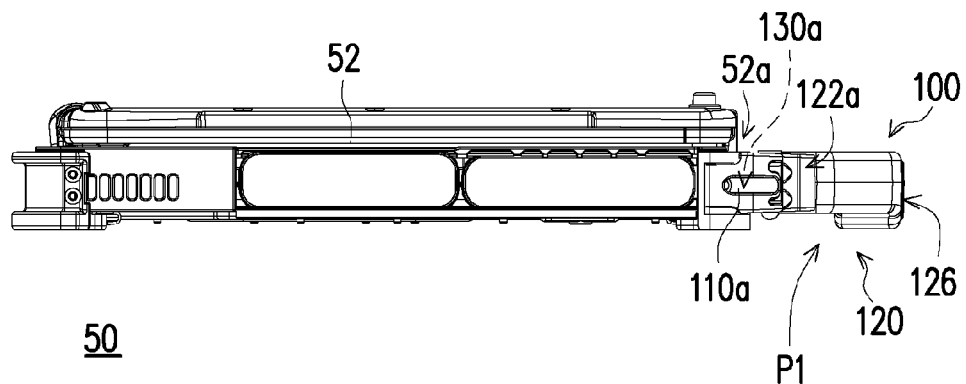
FIG. 5 and FIG. 6 are schematic views of operation of the electronic device of FIG. 1.
Figure 6:
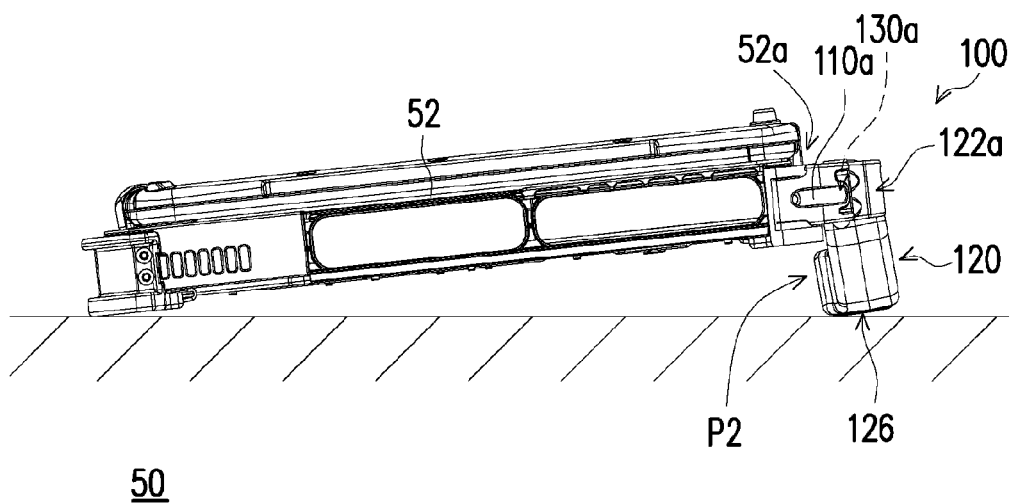

FIG. 5 and FIG. 6 are schematic views of operation of the electronic device of FIG. 1. Referring to FIG. 5 and FIG. 6, in this embodiment, the handle 100 is adapted to be disposed on the side 52a of the body 52 of the electronic device 50. The handheld portion 120 rotates relative to the fixing portions 110a, 110b through the ratchet 132 of the rotating modules 130a, 130b to the first position P1 or the second position P2 and then gets positioned through the positioning ball 134 of the rotating modules 130a, 130b. After the handheld portion 120 has rotated relative to the fixing portions 110a, 110b through the ratchet 132 to the first position P1 and got positioned by the positioning ball 134, the handheld portion 120 becomes parallel to the body 52, such that a user can manually hold the electronic device 50 by the handle 100, as shown in FIG. 5. After the handheld portion 120 has rotated relative to the fixing portions 110a, 110b through the ratchet 132 to the second position P2 and got positioned by the positioning ball 134, the handheld portion 120 moves to below the body 52, such that the handle 100 functions as the footrest, as shown in FIG. 6.

In this embodiment, the handheld portion 120 extends from the fixing portions 110a, 110b fixed to the side 52a of the body 52 and extends away from the side 52a, such that the handheld portion 120 and the side 52a are separated by the distance dl. Therefore, after the handheld portion 120 has rotated to and positioned at the first position P1, the user can put his or her hand into the gap defined by the distance dl to thereby hold the handheld portion 120, so as to manually hold the electronic device 50 by the handle 100. After the handheld portion 120 has rotated to and positioned at the second position P2, the handheld portion 120 moves to below the body 52 and protrudes outward, so that the electronic device 50 is underpinned by a platform, such as a desktop, when the handheld portion 120 functions as the footrest. The angle between the first position P1 and the second position P2 equals 80°, but the present invention is not limited thereto. For example, if the first position P1 is defined as 0° (i.e. the handheld portion 120 is parallel to the body 52), then the handheld portion 120 can be rotated by an angle which ranges from 0° to 80° as needed, so as to function as the footrest, whereas the operating angle of the electronic device 50 will depend on the position of the handheld portion 120 and therefore can be adjusted as needed.

In this embodiment, the handheld portion 120 has multiple protruding segments 126 (shown in FIG. 2) which protrude away from the side 52a. Furthermore, the protruding segments 126 each protrude from the surface of the handheld portion 120 and away from the side 52a. The protruding segments 126 are divided into two groups and therefore arranged symmetrically at two opposing ends of the handheld portion 120, respectively, to avoid compromising the sense of touch perceived by the user holding the handheld portion 120. Therefore, after the handheld portion 120 has rotated relative to the fixing portions 110a, 110b through the ratchet 132 to the second position P2, the protruding segments 126 protrudes the body 52 from below, so as to produce a non-skid effect when the handle 100 functions as the footrest, as shown in FIG. 6. Although the protruding segments 126 in this embodiment are exemplified by ribs and divided into two groups disposed at two opposing ends of the handheld portion 120, respectively, the present invention does not put a limit on the shape, quantity, position, and provision of the protruding segments 126; hence, the protruding segments 126 are subject to change as needed.

Therefore, in this embodiment, the handle 100 is adapted to be disposed on the side 52a of the body 52 of the electronic device 50. For instance, the handle 100 is fixed to the side 52a through the fixing portions 110a, 110b. After having rotated relative to the fixing portions 110a, 110b through the ratchet 132 of the rotating modules 130a, 130b to the first position P1 or the second position P2, the handheld portion 120 gets positioned by the positioning ball 134 of the rotating modules 130a, 130b, so as to allow the user to manually hold the electronic device 50 at the first position P1 or allow the handle 100 to function as the footrest at the second position P2. When the handheld portion 120 rotates to the second position P2, the user can hold the handheld portion 120 in the aforesaid manner and put the electronic device 50 at the elbow. Therefore, the present invention does not put a limit on the purposes corresponding to the position of the handle 100, as the purposes of the handle 100 are adjustable as needed. In this embodiment, the position of the handle 100 can be adjusted according to the design of the rotating modules 130*a*, 130*b*, such that the electronic device 50 is multipurpose when equipped with the handle 100.

In conclusion, the handle of the present invention is characterized in that: a fixing portion is fixed to the side of the body of an electronic device; the handheld portion is pivotally disposed at the fixing portions through the rotating modules; the ratchet of the rotating modules passes through the pivotal ends of the handheld portion, and the pivotal ends are pivotally disposed at the fixing portion; and the positioning ball of the rotating modules is fixed to the pivotal ends to correspond in position to the ratchet. Therefore, the handheld portion can rotate relative to the fixing portion through the rotating modules. The positioning ball moves along the differences of the ratchet while the handheld portion is rotating, such that the handheld portion produces an operating touch. After the handheld portion has rotated relative to the fixing portion through the ratchet to a first position or a second position, the handheld portion gets positioned by the positioning ball, so as to allow the user to manually hold the electronic device by the handle or allow the handle to function as the footrest. Therefore, the position of the handle of the present invention is adjustable by the rotating modules. Accordingly, the handle of the present invention is applicable to the electronic device, such that the electronic device is multipurpose when equipped with the handle.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A handle, adapted to be disposed on a side of a body of an electronic device, the handle comprising:
   at least one fixing portion fixed to the side of the body;
   a handheld portion pivotally disposed at the fixing portion and separated from the side of the body by a distance; and
   at least one rotating module comprising a ratchet and a positioning ball, wherein the ratchet has a plurality of differences and passes through a pivotal end of the handheld portion so as to be fixed to the fixing portion, such that the pivotal end of the handheld portion is pivotally disposed at the fixing portion, and the positioning ball is fixed to the pivotal end to correspond in position to the ratchet, wherein the positioning ball moves along the differences of the ratchet when the handheld portion rotates relative to the fixing portion, such that the handheld portion produces an operating touch corresponding to different angles during rotation thereof, and the handheld portion is positioned after rotating relative to the fixing portion through the ratchet to one of a first position and a second position;
   wherein the ratchet comprises a difference portion and a fastening portion connected to the difference portion, wherein the ratchet has multiple striplike grooves arranged along a perimeter of the difference portion and in a parallel manner to form the differences, and wherein the fastening portion is fastened to the fixing portion as soon as the ratchet passes through the pivotal end of the handheld portion.

2. The handle of claim 1, wherein an extension direction of the striplike grooves is parallel to a rotation axis which the handheld portion rotates about relative to the fixing portion, wherein the positioning ball is perpendicularly disposed above the striplike grooves, so as to move into or move out of the striplike grooves successively by moving across the surface of the ratchet while the handheld portion is rotating relative to the fixing portion, thereby producing an operating touch corresponding to different angles during rotation of the handheld portion.

3. The handle of claim 1, wherein the positioning ball comprises an embedding portion and a ball portion disposed at an end of the embedding portion, wherein the positioning ball is embedded in the pivotal end of the handheld portion through the embedding portion, and the ball portion is in contact with the striplike grooves of the ratchet, so as to move across surfaces of the striplike grooves through the ball portion while the handheld portion is rotating relative to the fixing portion.

4. The handle of claim 1, wherein, after the handheld portion has rotated relative to the fixing portion through the ratchet to the first position, the handheld portion becomes parallel to the body, such that a user can manually hold the electronic device by the handle, wherein the handheld portion moves to below the body after the handheld portion has rotated relative to the fixing portion through the ratchet to the second position, such that the handle functions as a footrest.

5. The handle of claim 4, wherein the handheld portion has at least one protruding segment protruding away from the side and protruding the body from below after the handheld portion has rotated relative to the fixing portion through the ratchet to the second position, thereby producing a non-skid effect when the handle functions as the footrest.

6. The handle of claim 1, wherein the handheld portion has a receiving chamber, and an operating component is adapted to be disposed in the receiving chamber.

7. The handle of claim 1, wherein the fixing portion has an admittance hole, and an operating component is adapted to be inserted into the admittance hole.

8. The handle of claim 1, wherein the fixing portion has a connection hole, and an operating component is adapted to connect with the connection hole through a connection line.

9. An electronic device, comprising:
   a body; and
   a handle disposed on a side of the body and comprising:
   at least one fixing portion fixed to the side of the body;
   a handheld portion pivotally disposed at the fixing portion and separated from the side of the body by a distance; and
   at least one rotating module comprising a ratchet and a positioning ball, wherein the ratchet has a plurality of differences and passes through a pivotal end of the handheld portion so as to be fixed to the fixing portion, such that the pivotal end of the handheld portion is pivotally disposed at the fixing portion, and the positioning ball is fixed to the pivotal end to correspond in position to the ratchet, wherein the positioning ball moves along the differences of the ratchet when the handheld portion rotates relative to the fixing portion, such that the handheld portion produces an operating touch corresponding to different angles during rotation thereof, and the handheld portion is positioned after rotating relative to the fixing portion through the ratchet to one of a first position and a second position;

wherein the ratchet comprises a difference portion and a fastening portion connected to the difference portion, wherein the ratchet has multiple striplike grooves arranged along a perimeter of the difference portion and in a parallel manner to form the differences, and wherein the fastening portion is fastened to the fixing portion as soon as the ratchet passes through the pivotal end of the handheld portion.

10. The electronic device of claim 9, wherein an extension direction of the striplike grooves is parallel to a rotation axis which the handheld portion rotates about relative to the fixing portion, wherein the positioning ball is perpendicularly disposed above the striplike grooves, so as to move into or move out of the striplike grooves successively by moving across the surface of the ratchet while the handheld portion is rotating relative to the fixing portion, thereby producing an operating touch corresponding to different angles during rotation of the handheld portion.

11. The electronic device of claim 9, wherein the positioning ball comprises an embedding portion and a ball portion disposed at an end of the embedding portion, wherein the positioning ball is embedded in the pivotal end of the handheld portion through the embedding portion, and the ball portion is in contact with the striplike grooves of the ratchet, such that the positioning ball moves across surfaces of the striplike grooves through the ball portion while the handheld portion is rotating relative to the fixing portion.

12. The electronic device of claim 9, wherein, after the handheld portion has rotated relative to the fixing portion through the ratchet to the first position, the handheld portion becomes parallel to the body, such that a user can manually hold the electronic device by the handle, wherein the handheld portion moves to below the body after the handheld portion has rotated relative to the fixing portion through the ratchet to the second position, such that the handle functions as a footrest.

13. The electronic device of claim 12, wherein the handheld portion has at least one protruding segment protruding away from the side and protruding the body from below after the handheld portion has rotated relative to the fixing portion through the ratchet to the second position, thereby producing a non-skid effect when the handle functions as the footrest.

14. The electronic device of claim 9, wherein the handheld portion has a receiving chamber, and an operating component is adapted to be disposed in the receiving chamber.

15. The electronic device of claim 9, wherein the fixing portion has an admittance hole, and an operating component is adapted to be inserted into the admittance hole.

16. The electronic device of claim 9, wherein the fixing portion has a connection hole, and an operating component is adapted to connect with the connection hole through a connection line.

* * * * *